United States Patent
Itagaki et al.

(10) Patent No.: US 11,403,798 B2
(45) Date of Patent: Aug. 2, 2022

(54) IMAGE PROCESSING APPARATUS, METHOD, AND PROGRAM

(71) Applicant: FUJIFILM Corporation, Tokyo (JP)

(72) Inventors: Kazuyuki Itagaki, Kanagawa (JP); Takatoshi Karino, Kanagawa (JP); Makoto Ozeki, Tokyo (JP); Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/160,692

(22) Filed: Jan. 28, 2021

(65) Prior Publication Data
US 2021/0150790 A1 May 20, 2021

Related U.S. Application Data

(63) Continuation of application No. PCT/JP2019/030258, filed on Aug. 1, 2019.

(30) Foreign Application Priority Data

Sep. 6, 2018 (JP) .............................. JP2018-166965

(51) Int. Cl.
*G06T 11/60* (2006.01)
*G06T 3/00* (2006.01)
(Continued)

(52) U.S. Cl.
CPC ............ *G06T 11/60* (2013.01); *G06T 3/0056* (2013.01); *G06T 3/40* (2013.01); *G06T 3/60* (2013.01); *G06T 11/001* (2013.01)

(58) Field of Classification Search
CPC ........... G06T 3/0056; G06T 1/00; G06T 3/40; G06T 11/001; G06T 3/60; G06T 11/60;
(Continued)

(56) References Cited

U.S. PATENT DOCUMENTS

| 6,987,535 B1* | 1/2006 | Matsugu | ............. G06F 3/04845 |
| | | | 348/239 |
| 2009/0034874 A1* | 2/2009 | Miller | .................... G06T 15/50 |
| | | | 382/279 |

(Continued)

FOREIGN PATENT DOCUMENTS

| CN | 107945102 A | 4/2018 |
| EP | 2750372 A1 | 7/2014 |

(Continued)

OTHER PUBLICATIONS

International Search Report issued in PCT/JP2019/030258; dated Oct. 29, 2019.

(Continued)

*Primary Examiner* — Jennifer Mehmood
*Assistant Examiner* — Andrew Shin
(74) *Attorney, Agent, or Firm* — Studebaker & Brackett PC

(57) ABSTRACT

Efficiency of work for laying out an object extracted from an image on another image is improved, and a burden on a user who performs the work is reduced. In S6, a second image attribute information extraction unit 15 extracts attribute information of a second image. In S7, a layout determination unit 16 determines a combining position of the object in the second image based on object attribute information, object surrounding attribute information, and second image attribute information. In S8, a correction unit 17 corrects at least one of the extracted object or the second image based on the object attribute information, the object surrounding attribute information, and the second image attribute information. In S9, the combining unit 18 creates a composite image obtained by combining the object (corrected object in a case where correction on object is performed) at a combining position of the second image (corrected second image in a case where correction on second image is performed). In (Continued)

S10, a display control unit 20 controls a display unit 19 to display the composite image.

17 Claims, 10 Drawing Sheets

(51) Int. Cl.
  *G06T 3/40* (2006.01)
  *G06T 3/60* (2006.01)
  *G06T 11/00* (2006.01)
(58) Field of Classification Search
  CPC .......... H04N 5/265; H04N 5/66; H04N 1/387; G09G 5/00
  See application file for complete search history.

(56) References Cited

U.S. PATENT DOCUMENTS

| | | |
|---|---|---|
| 2010/0157069 A1 | 6/2010 | Sakamaki |
| 2012/0038659 A1 | 2/2012 | Matsuguma et al. |
| 2014/0035950 A1 | 2/2014 | Jonsson |
| 2014/0184841 A1 | 7/2014 | Woo et al. |
| 2014/0368671 A1 | 12/2014 | Watanabe et al. |
| 2015/0118655 A1* | 4/2015 | Yamanashi ........ G06K 9/00261 434/100 |
| 2017/0011555 A1* | 1/2017 | Li ............................ G06T 1/60 |
| 2017/0076480 A1 | 3/2017 | Matsuoka |

FOREIGN PATENT DOCUMENTS

| | | |
|---|---|---|
| JP | H06-342457 A | 12/1994 |
| JP | H07-203299 A | 8/1995 |
| JP | 2005-228185 A | 8/2005 |
| JP | 2008-282094 A | 11/2008 |
| JP | 5636807 B2 | 12/2014 |
| JP | 2015-002423 A | 1/2015 |
| WO | 2013160663 A2 | 10/2013 |
| WO | 2014/169653 A1 | 10/2014 |

OTHER PUBLICATIONS

International Preliminary Report on Patentability and Written Opinion issued in PCT/JP2019/030258; dated Mar. 9, 2021.
An Office Action mailed by China National Intellectual Property Administration dated Apr. 7, 2022, which corresponds to Chinese Patent Application No. 201980057076.9 and is related to U.S. Appl. No. 17/160,692; with English language translation.

* cited by examiner

FIG. 3

| | OBJECT ATTRIBUTE INFORMATION | | | OBJECT SURROUNDING ATTRIBUTE INFORMATION | | | |
|---|---|---|---|---|---|---|---|
| OBJECT ID = OBJ1 | OBJECT TYPE | | LOGO | SUBJECT TYPE | | | FACE |
| | CHARACTER INFORMATION | | JAPAN | SUBJECT DIRECTION | | | FRONT |
| | | SIZE | 15 pt | INCLINATION ANGLE | YAW | | α |
| | | | | | PITCH | | β |
| | | | | | ROLL | | γ |
| | | COLOR | BLACK | POSITION OF EXTRACTED OBJECT | | | FOREHEAD |
| | | | | COLOR OF SURROUNDING OF EXTRACTED OBJECT | | | BLACK AND SKIN COLOR (LIGHT ORANGE) |

FIG. 4

| | OBJECT ATTRIBUTE INFORMATION | | | OBJECT SURROUNDING ATTRIBUTE INFORMATION | | |
|---|---|---|---|---|---|---|
| OBJECT ID = OBJ2 | OBJECT TYPE | JAPANESE FLAG | | SUBJECT TYPE | FACE | |
| | SIZE | 100 × 150 pt | | SUBJECT DIRECTION | FRONT | |
| | COLOR | INSIDE OF CENTRAL CIRCLE | RED | INCLINATION ANGLE | YAW | α |
| | | OUTSIDE | WHITE | | PITCH | β |
| | | | | | ROLL | γ |
| | | | | POSITION OF EXTRACTED OBJECT | LEFT CHEEK | |
| | | | | COLOR OF SURROUNDING OF EXTRACTED OBJECT | SKIN COLOR (LIGHT ORANGE) | |

| SECOND IMAGE FILE NAME | | img2. jpg |
|---|---|---|
| SUBJECT TYPE | | FACE |
| INCLINATION ANGLE | YAW | $\delta$ |
| | PITCH | $\theta$ |
| | ROLL | $\psi$ |
| COLOR | R1 | |
| | R2 | |
| | R3 | |
| | R4 | |
| | R5 | |
| | R6 | |

T3

IMAGE PROCESSING APPARATUS, METHOD, AND PROGRAM

CROSS-REFERENCE TO RELATED APPLICATIONS

The present application is a Continuation of PCT International Application No. PCT/JP2019/030258 filed on Aug. 1, 2019 claiming priority under 35 U.S.C. § 119(a) to Japanese Patent Application No. 2018-166965 filed on Sep. 6, 2018. Each of the above applications is hereby expressly incorporated by reference, in its entirety, into the present application.

BACKGROUND OF THE INVENTION

1. Field of the Invention

The present invention relates to an image processing apparatus, method, and program, and particularly to an image processing apparatus, method, and program for laying out an object extracted from an image on another image.

2. Description of the Related Art

Conventionally, there are a technique of extracting an optional object from an image based on an automatic operation or a user operation, and an image editing technique of performing a layout for pasting the object extracted from the image to another image.

JP2008-282094A discloses that a logo mark is extracted from an image of a business card, an attribute (name, address, and company name) is determined from the logo mark, and the extracted character information is corrected to improve character recognition accuracy.

JP2005-228185A discloses that a face part is extracted from a photograph, the face part is exaggerated and corrected according to the characteristics of the person, and the exaggerated and corrected face part is combined with material information (such as a face of a celebrity).

Other techniques related to the invention of the present application include JP5636807B and JP1994-342457A (JP-H06-342457A).

SUMMARY OF THE INVENTION

It is difficult to perform work for extracting an object from an image, work for editing the extracted object, or work for disposing the edited object at any position on another image with a portable information terminal such as a smartphone having a small screen.

In providing an application or an Internet service that involves such work, in a case where a user's labor is not reduced, a burden on the user increases and the enjoyment of using the service decreases, and thus the service is not used.

JP2008-282094A, JP2005-228185A, JP5636807B, and JP1994-342457A (JP-H06-342457A) do not disclose a technique of reducing an operation burden with a portable information terminal having a small screen, on the assumption that the work is performed on a desktop personal computer.

The present invention has been made in view of such a problem, and an object of the present invention is to provide an image processing apparatus, method, and program capable of improving efficiency of work for laying out an object extracted from an image on another image and reducing a burden on a user who performs the work.

An image processing apparatus according to a first aspect of the invention of the present application is an image processing apparatus that combines an object extracted from a first image with a second image, the apparatus comprising: an attribute information acquisition unit that acquires first attribute information which is attribute information of the object, surrounding attribute information which is attribute information of surroundings of the object, and second attribute information which is attribute information of the second image; a determination unit that determines a layout for combining the object with the second image based on the first attribute information, the surrounding attribute information, and the second attribute information; a correction unit that corrects at least one of the second image or the object based on the layout determined by the determination unit, the first attribute information, the surrounding attribute information, and the second attribute information; and a combining unit that combines the object with the second image based on the layout determined by the determination unit.

In the image processing apparatus according to a second aspect of the invention of the present application, the surrounding attribute information includes at least one of an inclination of a subject of the first image in a yaw direction, a pitch direction, and a roll direction, a size of the subject, a position of the object on the subject of the first image, or a color of the subject around the object, and the second attribute information includes at least one of an inclination of a subject of the second image in a yaw direction, a pitch direction, and a roll direction, a size or a color of the subject.

In the image processing apparatus according to a third aspect of the invention of the present application, the determination unit determines a layout for rotating and/or deforming the object according to a difference between the inclination of the subject of the first image in the yaw direction, the pitch direction, and the roll direction and the inclination of the subject of the second image in the yaw direction, the pitch direction, and the roll direction.

In the image processing apparatus according to a fourth aspect of the invention of the present application, the layout for rotating and/or deforming the object is made by projective transformation.

In the image processing apparatus according to a fifth aspect of the invention of the present application, the determination unit determines a layout in which a position of the object on the subject of the second image conforms to the position of the object on the subject of the first image.

In the image processing apparatus according to a sixth aspect of the invention of the present application, the position on the subject of the first image includes at least one of a forehead or a cheek of a face of the subject of the first image, and the position on the subject of the second image includes at least one of a forehead or a cheek of a face of the subject of the second image.

In the image processing apparatus according to a seventh aspect of the invention of the present application, the correction unit corrects the object by enlarging or reducing a size of the object according to a difference between a size of a subject of the first image and a size of a subject of the second image.

In the image processing apparatus according to an eighth aspect of the invention of the present application, the correction unit corrects a color of the object to a color conforming to a color of the second image.

In the image processing apparatus according to a ninth aspect of the invention of the present application, the correction unit corrects the object so that the object conforms to an attribute of the surroundings of the object disposed in the second image.

In the image processing apparatus according to a tenth aspect of the invention of the present application, an attribute of the surroundings of the object disposed in the second image includes at least one of a gloss or a reflectance, and the correction unit corrects the object by adding a mirror image to the object according to the attribute of the surroundings of the object.

In the image processing apparatus according to an eleventh aspect of the invention of the present application, the correction unit corrects the second image so that the attribute of the second image conforms to the attribute of the object.

In the image processing apparatus according to a twelfth aspect of the invention of the present application, the attribute of the object includes blurriness of a character.

In the image processing apparatus according to a thirteenth aspect of the invention of the present application, the object includes at least one of a character or a pattern.

An image processing method according to a fourteenth aspect of the invention of the present application is an image processing method, executed by a computer, for combining an object extracted from a first image with a second image, the method comprising: a step of acquiring first attribute information which is attribute information of the object, surrounding attribute information which is attribute information of surroundings of the object, and second attribute information which is attribute information of the second image; a step of determining a layout for combining the object with the second image based on the first attribute information, the surrounding attribute information, and the second attribute information; a step of correcting at least one of the second image or the object based on the layout, the first attribute information, the surrounding attribute information, and the second attribute information; and a step of combining the object with the second image based on the layout.

An image processing program according to a fifteenth aspect of the invention of the present application is a program for causing a computer to execute the image processing method according to the fourteenth aspect.

The invention determines the layout for combining the object with the second image based on the first attribute information, the surrounding attribute information, and the second attribute information, and corrects at least one of the second image or the object based on the layout determined by the determination unit, the first attribute information, the surrounding attribute information, and the second attribute information. Therefore, it is not necessary for a user to visually confirm the object of the first image and the attribute information of the second image and make correction manually, and efficiency of work for laying out the object extracted from the image on another image can be improved and the burden on the user who performs the work can be reduced.

BRIEF DESCRIPTION OF THE DRAWINGS

FIG. 3 is a diagram showing an example of an object attribute information table T1.

FIG. 4 is a diagram showing an example of an object attribute information table T2.

DESCRIPTION OF THE PREFERRED EMBODIMENTS

Figure 1:
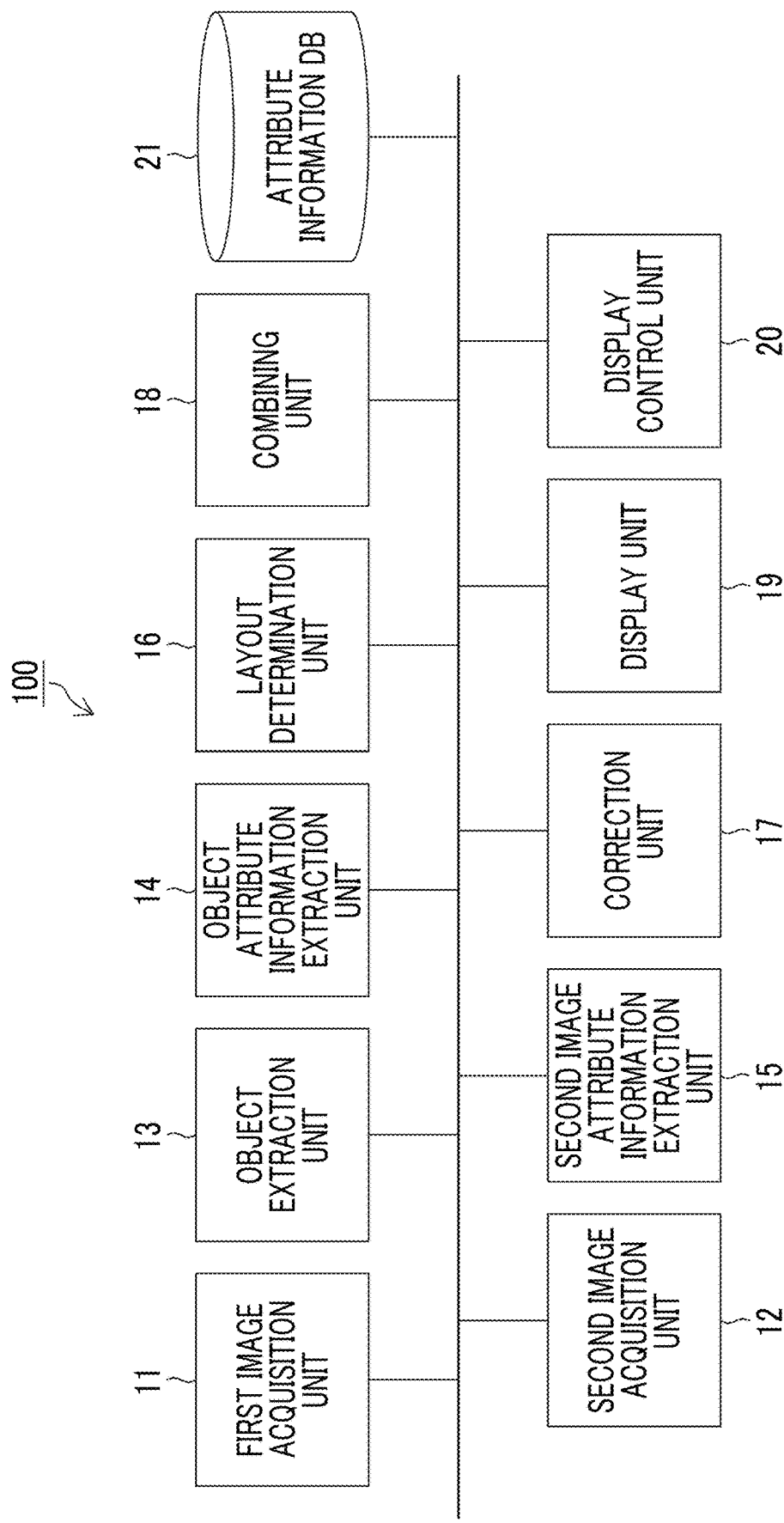
FIG. 1 is a block configuration diagram of an image processing apparatus 100.

FIG. 1 is a block diagram of an image processing apparatus according to a preferred embodiment of the present invention. An image processing apparatus 100 comprises a first image acquisition unit 11, a second image acquisition unit 12, an object extraction unit 13, an object attribute information extraction unit 14, a second image attribute information extraction unit 15, a layout determination unit 16, a correction unit 17, a combining unit 18, a display unit 19, a display control unit 20, and an attribute information database (abbreviated as DB) 21.

The image processing apparatus 100 itself can typically be configured by a portable information processing terminal such as a smartphone, a tablet computer, or a notebook computer, but may be configured by a desktop computer.

The first image acquisition unit 11, the second image acquisition unit 12, the object extraction unit 13, the object attribute information extraction unit 14, the second image attribute information extraction unit 15, the layout determination unit 16, the correction unit 17, and the combining unit 18 are composed of one or a plurality of computers (processors). The processor includes a central processing unit (CPU), an application specific integrated circuit (ASIC), a graphics processing unit GPU), and the like.

The display unit 19 is composed of a display device such as a liquid crystal display. The display control unit 20 is composed of a display driver integrated circuit (IC) or the like.

The attribute information database 21 is composed of various memories such as SDRAM and flash memory, but may be composed of cloud computing.

The first image acquisition unit 11 acquires a first image from an imaging device, an external semiconductor memory, an external server connected via a network, and the like. The first image is an image from which an object is extracted.

Figure 2:
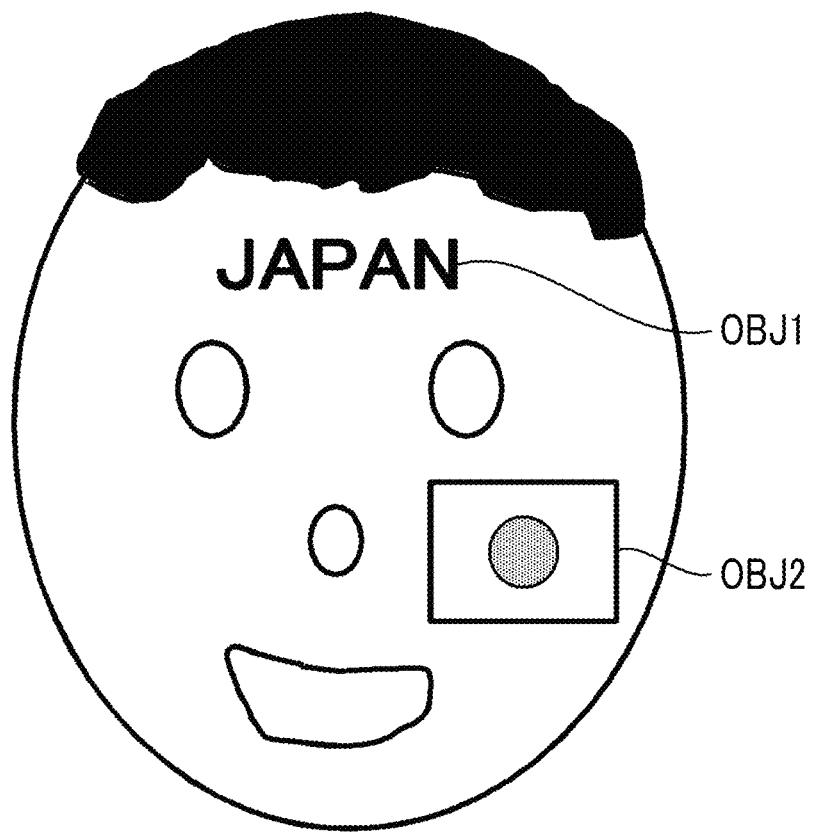
FIG. 2 is a diagram showing an example of a first image.

FIG. 2 shows an example of the first image. This first image has an OBJ1 which is a paint of a logo "JAPAN" applied to a forehead of a face of a person and an object OBJ2 which is a Japanese flag-shaped paint applied to a cheek part of a face of a person.

The second image acquisition unit 12 acquires a second image from an imaging device, an external semiconductor memory, an external server connected via a network, and the like. The second image is an image to be combined with the object extracted from the first image.

The object extraction unit 13 extracts an object from the first image acquired by the first image acquisition unit 11.

The object attribute information extraction unit 14 extracts object attribute information which is attribute information on an image of the extracted object and object surrounding attribute information which is attribute information of an image around the object extracted in the first image.

The object attribute information includes a type of the object, a position of the object, character information in a case where the type of the object is a character such as a logo, a size of the object, color information of the object, and the like.

The object surrounding attribute information includes a type of a subject image of the extracted object (for example, a face of a person), a direction of the subject image of the extracted object (for example, front facing), a size of the subject image of the extracted object, an inclination angle of inclination of the subject image of the extracted object in a yaw direction, a pitch direction, and a roll direction, a position of the extracted object in the subject image (for example, a forehead, a cheek, or the like), a color of the subject image around the extracted object (for example, in a case where the surrounding subject is a forehead of a person, the color is a color of the person's skin, and in a case where the surrounding subject is a night scene, the color is black), and the like.

The yaw direction refers to a direction in which a subject whose front and rear, left and right, and up and down are fixed rotates around an up-down axis (that is, a direction of rotation in a horizontal plane), the pitch direction refers to a direction of rotation around a left-right axis, and the roll direction refers to a direction of rotation around a front-rear axis.

As illustrated in FIG. 3, object attribute information and object surrounding attribute information regarding the extracted object OBJ1 are stored in the attribute information DB 21 as an object attribute information table T1.

In addition, as illustrated in FIG. 4, object attribute information and object surrounding attribute information regarding the extracted object OBJ2 are stored in the attribute information DB 21 as an object attribute information table T2.

The object attribute information table is created each time an object is extracted.

The second image attribute information extraction unit 15 extracts attribute information of the second image acquired by the second image acquisition unit 12. The attribute information of the second image includes a type of a subject of the second image (for example, a face), a size of the subject of the second image, coordinates of regions having different colors, colors assigned to the regions, and the like.

Figures 5, 6:
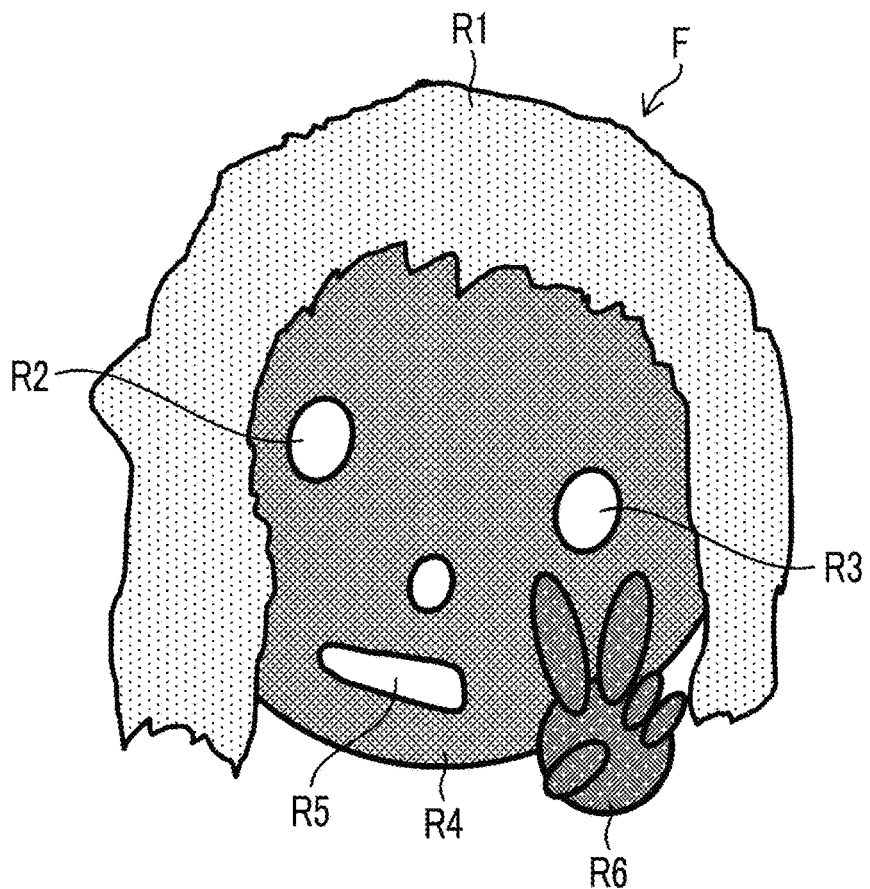
FIG. 5 is a diagram showing an example of a second image.
FIG. 6 is a diagram showing an example of a second image attribute information table T3.

FIG. 5 shows an example of the second image. In this second image, a face image F of the subject includes a black hair region R1, a right eye region R2, a left eye region R3, a nose region R4, a mouth region R5, and a hand region R6.

As illustrated in FIG. 6, second image attribute information is stored in the attribute information DB 21 as a second image attribute information table T3. The second image attribute information table need only be created once in a case where the second image is acquired.

The layout determination unit 16 determines a layout (combining position) of the object in the second image based on the object attribute information, the object surrounding attribute information, and the second image attribute information.

The correction unit 17 corrects at least one of the extracted object or the second image based on the object attribute information, the object surrounding attribute information, and the second image attribute information.

The combining unit 18 creates a composite image obtained by combining the object (corrected object in a case where correction on object is performed) at a combining position of the second image (corrected second image in a case where correction on second image is performed).

The display unit 19 displays an optional image such as a first image, a second image, an extracted object, a corrected object, a corrected second image, and a composite image under the control of the display control unit 20.

The display control unit 20 controls for switching display contents of the display unit 19 according to a user instruction or various programs.

Figure 7:
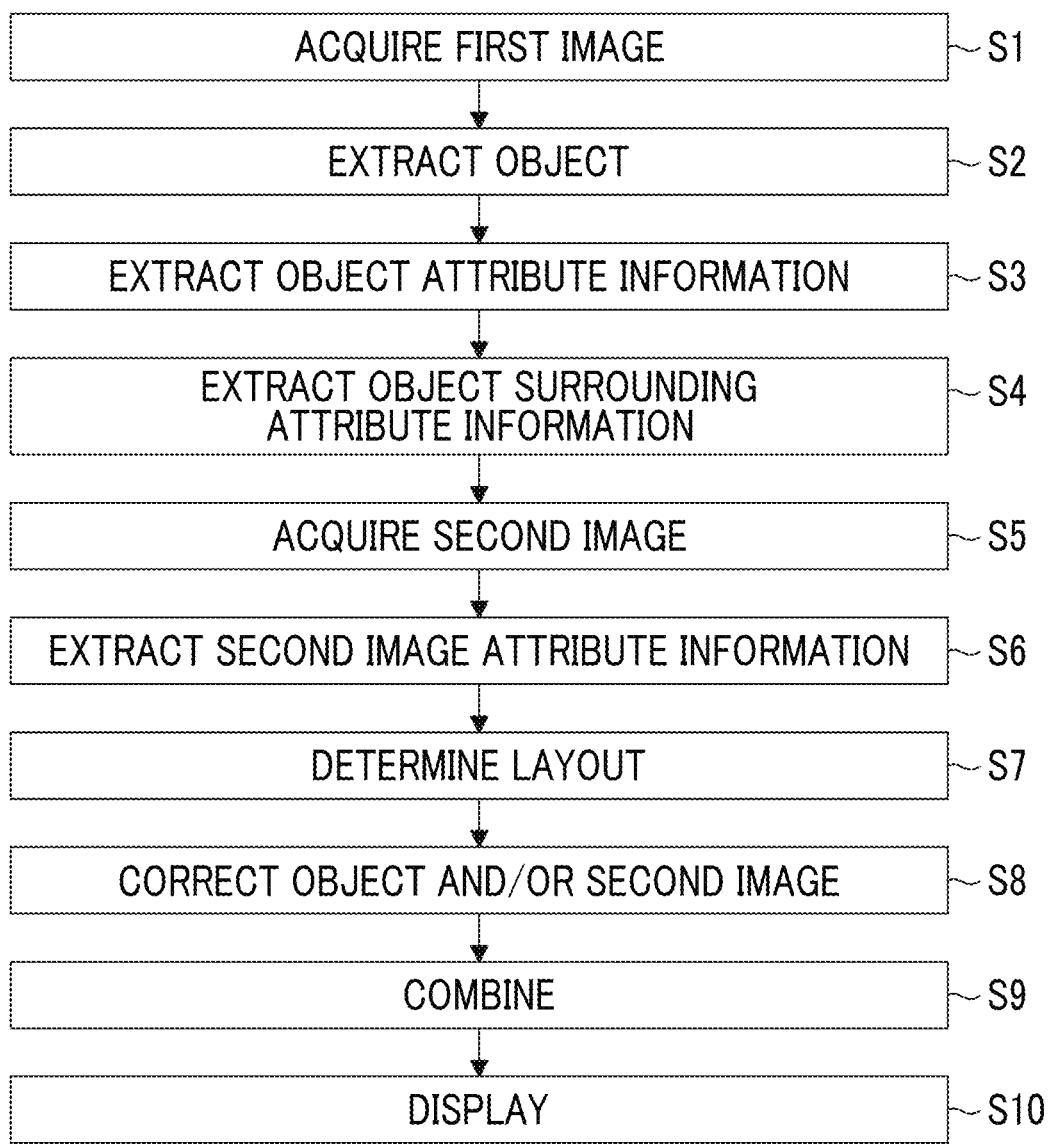
FIG. 7 is a flowchart showing a flow of object combining processing.

FIG. 7 is a flowchart showing a flow of object combining processing executed by the image processing apparatus 100. A program for causing the image processing apparatus 100 and various other computers (processors) to execute this processing is recorded in the image processing apparatus 100 and various other computer (processor)-readable recording media such as SDRAM, ROM, and CD-ROM.

In S1, the first image acquisition unit 11 acquires a first image.

In S2, the object extraction unit 13 extracts an object from the first image.

In S3, the object attribute information extraction unit 14 extracts object attribute information from the extracted object.

In S4, the object attribute information extraction unit 14 extracts object surrounding attribute information which is attribute information of an image around the object extracted in the first image.

In S5, the second image acquisition unit 12 acquires a second image.

In S6, the second image attribute information extraction unit 15 extracts attribute information of the second image.

In S7, the layout determination unit 16 determines a combining position of the object in the second image based on the object attribute information, the object surrounding attribute information, and the second image attribute information.

In S8, the correction unit 17 corrects at least one of the extracted object or the second image based on the object attribute information, the object surrounding attribute information, and the second image attribute information.

In S9, the combining unit 18 creates a composite image obtained by combining the object (corrected object in a case where correction on object is performed) at a combining position of the second image (corrected second image in a case where correction on second image is performed).

In S10, the display control unit 20 controls the display unit 19 to display the composite image.

FIGS. 8 to 13 show examples of correction of the object and/or the second image, the layout of the object, and the composite image of the object and the second image.

Figure 8:
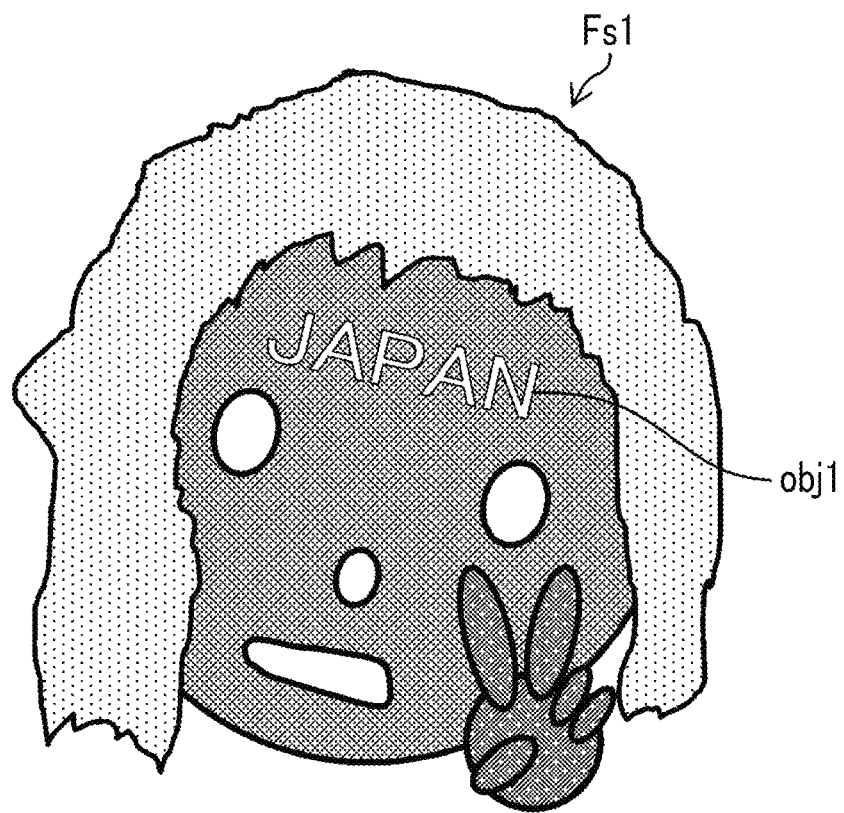
FIG. 8 is a diagram showing an example of a combining position of an object obj1 obtained by inverting an object OBJ1 in a second image in black and white.

As illustrated in FIG. 8, in a case where a position of the object OBJ1 in the first image is "forehead", a combining position of the object OBJ1 in the second image is determined to be "forehead".

In addition, as illustrated in FIG. 8, it is assumed that a color in the attribute information of the object OBJ1 with a logo of the object "JAPAN" is "black", and a color of an area to which a combining position of the object belongs in the second image attribute information is "brown". In this case, in a case where the black logo is combined with the brown area, the logo is hardly seen. Therefore, an object obj1 with the logo "JAPAN" subjected to correction for inverting the black logo to white is combined with the forehead, and a composite image Fs1 is obtained.

Figure 9:
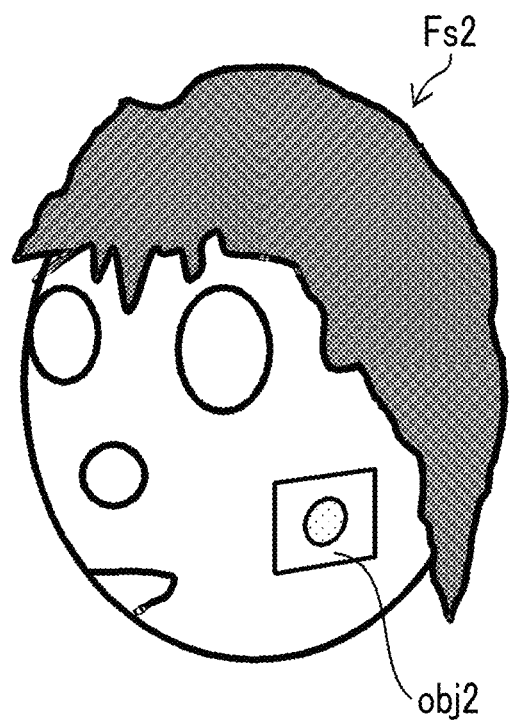
FIG. 9 is a diagram showing an example of a combining position of an object obj2 obtained by affine-transforming an object OBJ2 in a second image.

As illustrated in FIG. 9, in a case where a position of the object OBJ2 is "left cheek", a combining position of the object in the second image is determined to be "left cheek".

In addition, as illustrated in FIG. 9, in a case where a direction of the subject of the object OBJ2 (FIG. 2) which is a Japanese flag paint in the object attribute information is "front", and a direction of the subject in the second image attribute information is 45 degrees in the right yaw direction and 10 degrees in the lower pitch direction, an object obj2 subjected to correction for performing affine-transformation (more generally projective transformation) to move in parallel, rotate, enlarge, or reduce the object OBJ2 to 45 degrees in the right yaw direction and 10 degrees in the lower pitch direction is combined to obtain a composite image Fs2.

Figure 10:
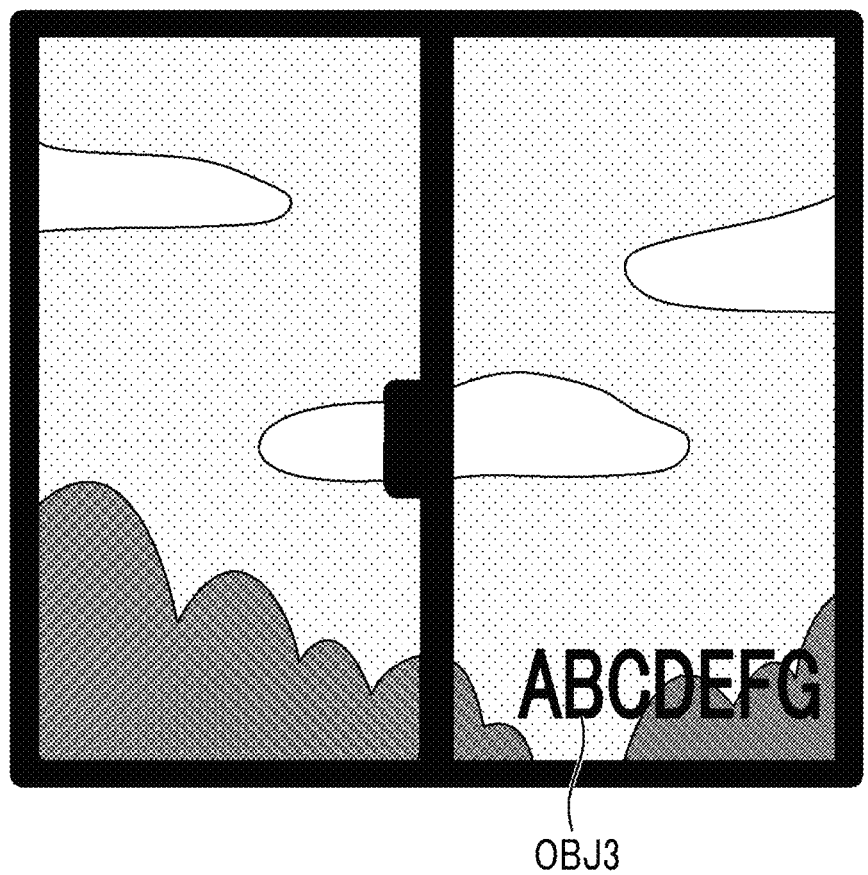
FIG. 10 is a diagram showing an example of a photographic scene of an image in which a logo of an object "ABCDEFG" is combined.
Figure 11:
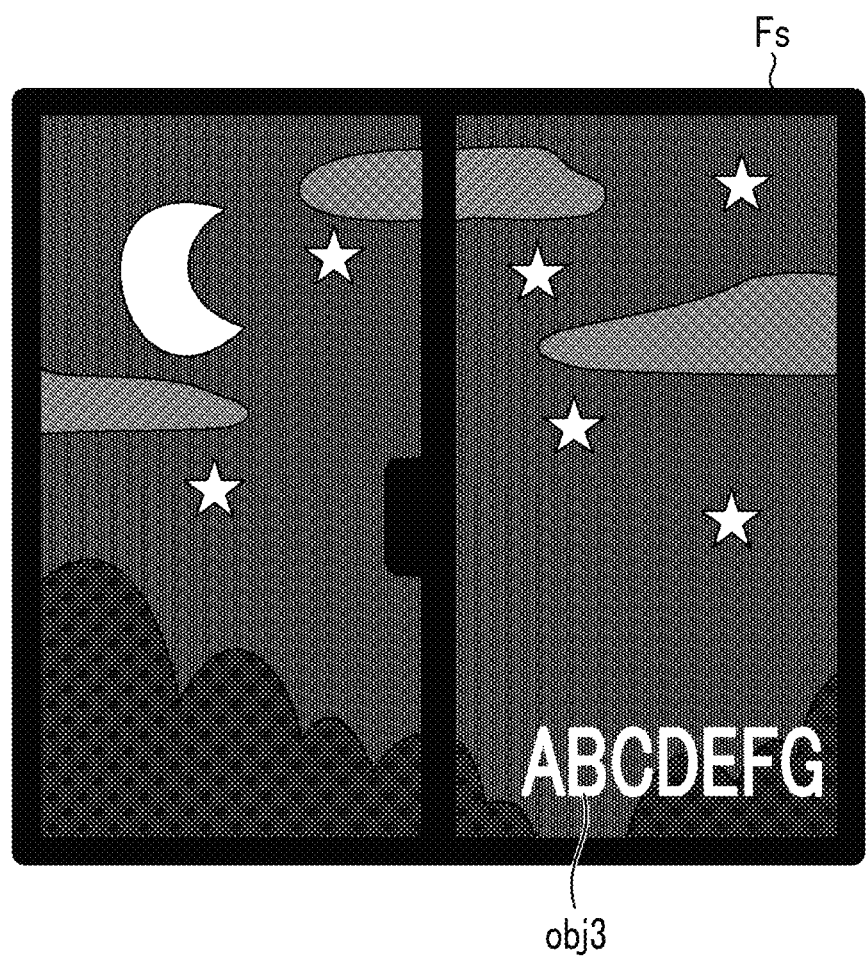
FIG. 11 is a diagram showing an example of a photographic scene of an image in which an object obj3 obtained by inverting a logo OBJ3 of the object "ABCDEFG" in black and white is combined.

For example, as illustrated in FIG. 10, it is assumed that a color of an object OBJ3 with the logo "ABCDEFG" in the object attribute information is "black", a photographic scene in the object surrounding attribute information is "daytime", and a photographic scene in the second image attribute information is "night view". In this case, in a case where this black logo is combined with the night view, the logo is hardly seen. Therefore, an object obj3 with the logo "ABCDEFG" subjected to correction for inverting the black logo to white is combined. The combining position is determined to be a lower right position of the image common to the first image and the second image. A composite image Fs is obtained by combining the object obj3 with the second image.

Information of the photographic scene can be acquired or estimated from photographing date and time information included in image tag information (exchangeable image file format (Exif)), color information of brightness, saturation, and hue of the image, and the like.

Figure 12:
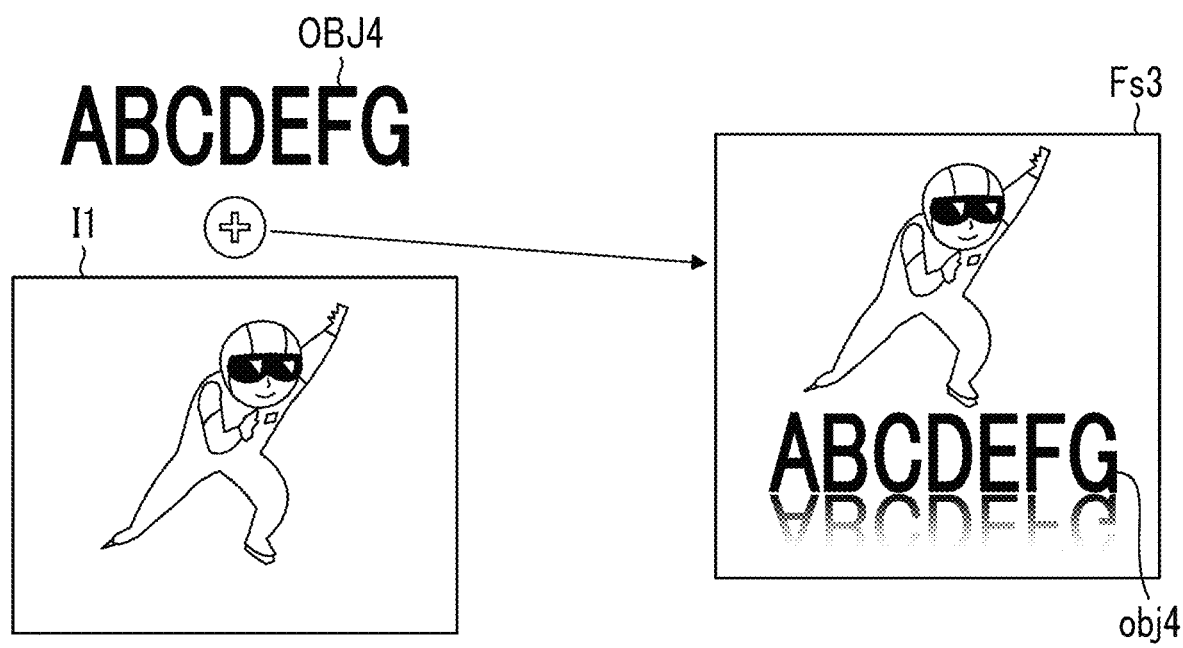
FIG. 12 is a diagram showing an example of combining of an object obj4 subjected to correction for adding a decorative image in a state where a logo OBJ4 is mirror-reflected on an object OBJ4.

In addition, for example, as illustrated in FIG. 12, in a case where a type of a subject in the second image attribute information is "ice", correction for adding a decorative image in a state where an object OBJ4 with the logo "ABCDEFG" extracted from the first image is mirror-reflected to the object OBJ4 with the logo "ABCDEFG" is performed, and an object obj4 after correction is obtained. A composite image Fs3 in which the object obj4 after correction is combined with a lower part of the second image is obtained.

Figure 13:
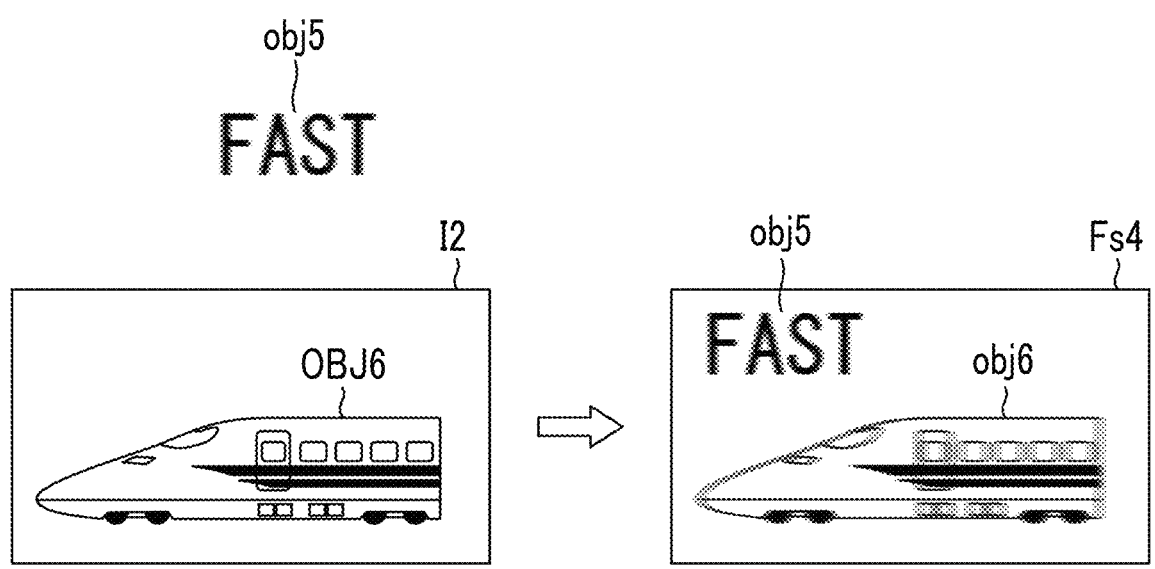
FIG. 13 shows an example of an object obj6 obtained by correction in which a subject OBJ6 of "Shinkansen" in a second image is given image modification of "moving body blur" in response to moving body blur of an object obj5 of "fast".

For example, as illustrated in FIG. 13, in a case where character information included in the object attribute information of an object obj5 of "fast" is "fast", a type of character modification is "moving body blur", and a type of a subject of an object OBJ6 included in the second image attribute information is "Shinkansen", correction for applying image modification of "moving body blur" to the object OBJ6 of "Shinkansen" of the second image is performed to obtain an object obj6. The combining position of the object obj5 of "fast" is determined to be a blank part of the second image. A composite image Fs4 is obtained by combining the object obj5 of "fast" with the second image.

In FIGS. 8 to 13, the common correction includes adjustment of the object size. That is, the object is enlarged or reduced so that a ratio of the object size included in the object attribute information to the subject size of the first image included in the object surrounding attribute information is maintained even in relation to the subject of the second image after combining.

In this way, at least one of the object of the first image or the second image is corrected based on the attribute information of the object of the first image, the surrounding attribute information of the object extracted from the first image, and the attribute information of the second image, and the combining position of the object of the first image to the second image is determined. Therefore, a user can obtain the composite image without having to perform correction of the object, correction of the second image, and determination of the combining position by manual operation.

Therefore, it is not necessary for a user to visually confirm the object of the first image and the attribute information of the second image and make correction manually, and efficiency of work for laying out the object extracted from the image on another image can be improved and the burden on the user who performs the work can be reduced.

Explanation of References

11: first image acquisition unit
12: second image acquisition unit
13: object extraction unit
14: object attribute information extraction unit
15: second image attribute information extraction unit
16: layout determination unit
17: correction unit
18: combining unit
19: display unit
20: display control unit
21: attribute information database
100: image processing apparatus

What is claimed is:

1. An image processing apparatus that combines an object extracted from a first image with a second image, the apparatus comprising a processor configured to:
acquire first attribute information which is attribute information of the object, including a type, size, and color of the object;
acquire surrounding attribute information which is attribute information of surroundings of the object including a type, an inclination angle, and a color of a subject of the first image;
acquire second attribute information which is attribute information of the second image including an inclination angle, a size, and a color of a subject of the second image;
determine a layout for combining the object with the second image based on the acquired first attribute information, the acquired surrounding attribute information, and the acquired second attribute information according at least to a difference between the inclination angle of the surrounding attribute information and the inclination angle of the second attribute information;

correct at least one of the second image or the object based on the determined layout, the acquired first attribute information, the acquired surrounding attribute information, and the acquired second attribute information by adjusting at least the size, position, and color of the at least one of the second image or the object; and after correcting at least one of the second image or the object, combine the object with the second image based on the determined layout and display the resulting combined image.

2. The image processing apparatus according to claim 1, wherein the surrounding attribute information further includes at least one of an inclination of a subject of the first image in a yaw direction, a pitch direction, and a roll direction, a size of the subject, and a position of the object on the subject of the first image, and the second attribute information includes at least one of an inclination of a subject of the second image in a yaw direction, a pitch direction, and a roll direction, a size or a color of the subject of the second image.

3. The image processing apparatus according to claim 2, wherein the processor is configured to determine a layout for rotating and/or deforming the object according to a difference between the inclination of the subject of the first image in the yaw direction, the pitch direction, and the roll direction and the inclination of the subject of the second image in the yaw direction, the pitch direction, and the roll direction.

4. The image processing apparatus according to claim 3, wherein the layout for rotating and/or deforming the object is made by projective transformation.

5. The image processing apparatus according to claim 2, wherein the processor is configured to determine a layout in which a position of the object on the subject of the second image conforms to the position of the object on the subject of the first image.

6. The image processing apparatus according to claim 5, wherein the position on the subject of the first image includes at least one of a forehead or a cheek of a face of the subject of the first image, and the position on the subject of the second image includes at least one of a forehead or a cheek of a face of the subject of the second image.

7. The image processing apparatus according to claim 1, wherein the processor is configured to correct the object by enlarging or reducing a size of the object according to a difference between a size of a subject of the first image and a size of a subject of the second image.

8. The image processing apparatus according to claim 1, wherein the processor is configured to correct a color of the object to a color conforming to a color of the second image.

9. The image processing apparatus according to claim 1, wherein the processor is configured to correct the object so that the object conforms to an attribute of the surroundings of the object disposed in the second image.

10. The image processing apparatus according to claim 1, wherein an attribute of the surroundings of the object disposed in the second image includes at least one of a gloss or a reflectance, and the processor is configured to correct the object by adding a mirror image to the object according to the attribute of the surroundings of the object.

11. The image processing apparatus according to claim 1, wherein the processor is configured to correct the second image so that the attribute of the second image conforms to the attribute of the object.

12. The image processing apparatus according to claim 11, wherein the attribute of the object includes blurriness of a character.

13. The image processing apparatus according to claim 1, wherein the object includes at least one of a character or a pattern.

14. The image processing apparatus according to claim 1, wherein the processor is configured to correct at least one of the second image or the object by at least one of inverting the color of the object, adding a mirror image to the object, or applying an image modification of moving body blur to the second image.

15. An image processing method, executed by a computer, for combining an object extracted from a first image with a second image, the method comprising:

a step of acquiring first attribute information which is attribute information of the object, including a type, size, and color of the object;

a step of acquiring surrounding attribute information which is attribute information of surroundings of the object including a type, an inclination angle, and a color of a subject of the first image;

a step of acquiring second attribute information which is attribute information of the second image including an inclination angle, a size, and a color of a subject of the second image;

a step of determining a layout for combining the object with the second image based on the acquired first attribute information, the acquired surrounding attribute information, and the acquired second attribute information according at least to a difference between the inclination angle of the surrounding attribute information and the inclination angle of the second attribute information;

a step of correcting at least one of the second image or the object based on the determined layout, the acquired first attribute information, the acquired surrounding attribute information, and the acquired second attribute information by adjusting at least the size, position, and color of the at least one of the second image or the object; and after the step of correcting at least one of the second image or the object, a step of combining the object with the second image based on the determined layout and displaying the combined image.

16. A non-transitory computer-readable recording medium that causes a computer to execute the image processing method according to claim 15 in a case where a command stored in the recording medium is read by the computer.

17. The image processing method according to claim 15, wherein
the step of correcting at least one of the second image or the object includes a step of correcting at least one of the second image or the object by at least one of inverting the color of the object, adding a mirror image to the object, or applying an image modification of moving body blur to the second image.

* * * * *